Sept. 30, 1930.    W. S. ALLEN    1,777,025
METHOD OF MANUFACTURING CHEMICALLY PURE SULPHURIC ACID
Filed Nov. 14, 1927
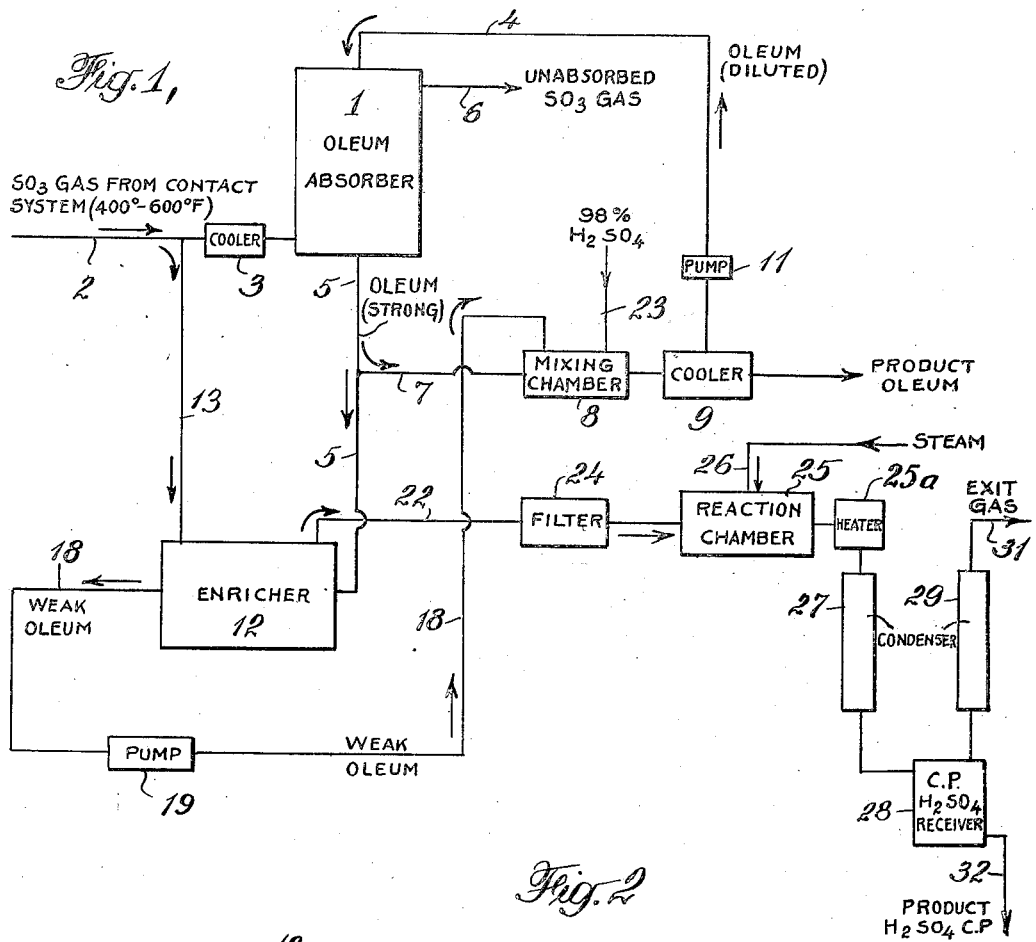
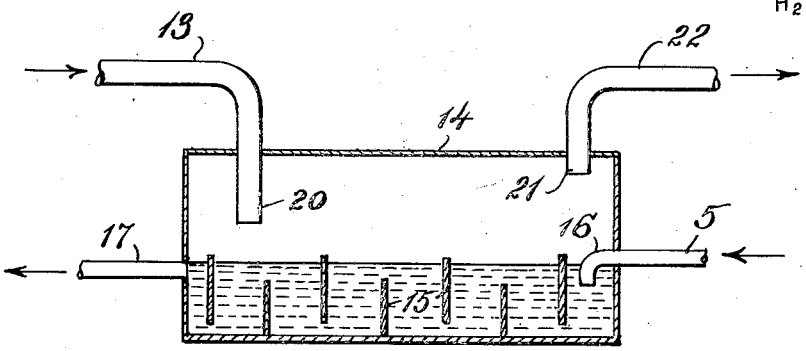
INVENTOR
WALTER S. ALLEN.
BY Forbes Silsby
ATTORNEY Patented Sept. 30, 1930

1,777,025

UNITED STATES PATENT OFFICE

WALTER S. ALLEN, OF FLUSHING, NEW YORK, ASSIGNOR TO GENERAL CHEMICAL COMPANY, OF NEW YORK, N. Y., A CORPORATION OF NEW YORK

METHOD OF MANUFACTURING CHEMICALLY-PURE SULPHURIC ACID

Application filed November 14, 1927. Serial No. 233,021.

This invention relates to the manufacture of sulphuric acid, and more particularly to a method of manufacturing sulphuric acid of a high degree of purity.

In an earlier application, Serial No. 734,853 filed August 29, 1924, I have described a method of manufacturing sulphuric acid of the type commercially known as "C. P." (chemically pure) based upon the hydration of sulphuric anhydride gas under conditions which result in a product having a high degree of purity and which substantially eliminate the co-formation during the operation of the very undesirable sulphuric acid mist. In that method I usually utilize the gases containing sulphuric anhydride produced from sulfur dioxide and oxygen by the contact process.

I have found that the productive capacity of a plant employing the above C. P. process is practically proportional to the concentration of sulphuric anhydride in the gases. Hence it would be desirable to enhance further the commercial practicability of that method by increasing the sulphuric anhydride concentration in the gases furnished for the manufacture of the C. P. sulphuric acid without an appreciable increase in cost or added inconvenience.

The object of my invention is to provide a method of manufacturing sulphuric acid of a high degree of purity embodying the above principle, which utilizes readily available sources of sulphuric anhydride.

The novel method by which I attain the desired object is based broadly upon the use of gaseous sulphuric anhydride and hydrogen oxide under appropriate conditions, and contemplates the use of the sulphuric anhydride containing gases resulting in the contact process for making sulphuric acid in conjunction with sulphuric anhydride gas obtained from oleum, the whole being applied in a novel and efficient manner as will be apparent as the description proceeds.

Fig. 1 shows diagrammatically one arrangement of a system adapted for practising my invention, and Fig. 2 is a sectional elevation of one suitable form of enricher.

Referring to the drawings, and in particular to Fig. 1, reference numeral 1 designates an oleum absorbing tower of any well-known type as used in the contact process for manufacturing sulphuric acid.

In the contact process as generally practised the temperature of the sulphuric anhydride containing gases issuing from the converters is quite high and the gas is ordinarily passed through a cooler or heat exchanger to lower its temperature to some point intermediate 400° F. and 600° F., at which temperature, after some slight further cooling by radiation from the pipe lines, it may be passed to the sulphuric acid absorber. Such a system is disclosed, for example, in the U. S. patent to Merriam, #1,384,566, issued July 12, 1921. When, however, the system is used to produce oleum, the gas must be at an appreciably lower temperature at the point of entering the oleum absorber, a reduction to substantially 200° F. being satisfactory for most purposes. The present invention is particularly designed to operate in conjunction with the contact process as generally operated, and hence the hot sulphuric anhydride containing gases from the contact process converter-heat-exchanger system are conducted by the pressure of the blowers forming part of the system through line 2 to a cooler 3 where their temperature is reduced to substantially 200° F. The cooled gases are then delivered into the bottom of the oleum absorber 1 and pass upwardly therethrough.

Cool oleum is conducted to the absorber 1 through a line 4 which leads into the upper part thereof, and in the absorber this oleum comes in intimate contact with the sulphuric anhydride containing gases passing upwardly therein, extracting a portion of their sulphuric anhydride content in its downward passage, and is then conducted away by the line 5 at the bottom of the absorber, the oelum leaving the absorber having an appreciably higher percentage of sulphuric anhydride and a higher temperature than that entering the absorber. The gases with reduced sulphuric anhydride content pass off through line 6 to other absorbers for further treatment. A line 7 conducts a portion of the strong oleum from line 5 to a mixing chamber 8, where weak oleum from a source to be described hereinafter is also introduced, and in addition, 98% $H_2SO_4$ in such amounts as to accomplish dilution to the strength desired.

From this chamber 8 the oleum is passed through a suitable cooler 9 from which the product oleum is withdrawn in desired quantity, another portion of the oleum from the cooler 9 being returned by means of a pump 11 to the line 4 leading to the absorber 1, where a strong oleum is again produced, and the cycle repeated.

The line 5 conducts a portion of the strong oleum from the absorber 1 to an enricher 12 through which sulphuric anhydride containing gases from the converters are flowing, said gases being conducted to the enricher 12 by a line 13 which connects with the line 2 from the contact process system at a point in advance of the cooler 3. By cutting into line 2 at a point immediately following the last heat-exchanger in the contact process converter-heat-exchanger system (not shown) the temperature of the gases conducted to the enricher will be around 400–600° F. as previously stated and will be quite suitable, but if higher temperature gases are desired the line 13 can be introduced between the last converter and its heat-exchanger.

In Fig. 2 I have shown an illustrative embodiment of the enricher 12. Reference numeral 14 designates the shell of this enricher, made of steel or other suitable material and mounted in the sides of the shell and extending transversely thereof is a series of staggered steel baffle plates 15 for thoroughly mixing the oleum in its flow through the enricher and prolonging the distance of flow.

In one end wall of the shell 14 an inlet pipe 16 is provided leading from the supply line 5 carrying the strong oleum, and in the opposite end wall is an outlet pipe 17 connecting with a line 18 which leads through a pump 19 to the mixing chamber 8. In the upper part of the shell, at the end in which the outlet pipe 17 is situated, a gas inlet pipe 20 is provided connecting with line 13, through which pipe are introduced the gases containing sulphuric anhydride coming from the converters in the contact process system. It is desirable of course to provide a suitable valve for regulation of the flow of gases into the inlet pipe 20, particularly if the pressure of the blowers in the contact process system results in too rapid a flow of gas through the enricher. Above the oleum inlet 16 a gas outlet pipe 21 is provided connecting with a line 22 leading to a C. P. sulphuric acid system, for conducting thereto the gases after their $SO_3$ concentration has been increased.

As will be seen from a study of Fig. 2, the strong oleum is passed into the enricher through pipe 16 and out through the pipe 17, a counter-current of gas from the converters being simultaneously maintained, entering the enricher through pipe 20 and leaving through pipe 21, the respective rates of flow being regulated to provide the desired period of contact of the gas and the oleum.

Other suitable constructions may be substituted for the enricher just described. For example, any of the well-known oleum absorbing towers will suffice in this relation.

The hot entering gases passing in contact with the cooler and stronger oleum raise the temperature of the oleum, which thereupon gives up a portion of its $SO_3$ to these gases. This contact is maintained sufficiently long to substantially approach equilibrium and thus accomplish the most efficient enrichment of the gases. If it is desired to obtain greater enrichment than that possible under the temperature conditions existing, supplementary heating of the oleum in the enricher or of the gases being conducted thereinto may be resorted to.

The weakened oleum resulting is pumped through line 18 by pump 19 and into the mixing chamber 8 where the oleum from the line 7 and 98% $H_2SO_4$ through line 23 are also introduced, the diluted oleum resulting thereafter passing through the cooler 9, whence part of it is again conducted to the absorber 1 where additional $SO_3$ is absorbed to restrengthen the oleum. Circulation of the oleum is maintained by the pumps 11 and 19.

The gases with the enriched content of $SO_3$ are then conducted from the enricher 12 by line 22 to a filter 24 containing any suitable material, such as pieces of quartz, for removing suspended impurities from the gases.

As noted in my earlier filed application hereinbefore identified, I find that a temperature of about 200° F. in the sulphuric anhydride containing gases works very satisfactorily in my method of making C. P. $H_2SO_4$, although appreciable deviations from this temperature may at times be necessary. The temperature of the gases leaving the enricher 12 will vary somewhat depending upon the temperatures of the entering oleum and entering gases from the contact system, the rates of flow, etc., but no difficulty is involved in obtaining substantially the temperature desired for most efficient operation of the subsequent C. P. system. This regulation of the temperature in the enricher is most readily accomplished by regulation of the temperature of the entering gases from the contact system, and this is easily accomplished, as previously explained, by varying the point at which these gases are withdrawn from the contact system.

From the filter 24 the gases are then conducted to a reaction chamber 25 into which hot hydrogen oxide, generally as steam, from any suitable source, such as a water still, is simultaneously introduced at 26, in regulated amounts, to form $H_2SO_4$ vapor of the desired concentration. The injection of hot hydrogen oxide (steam) in controlled volume to form acid of say 95% $H_2SO_4$ results in a very considerable increase in temperature in the reaction chamber (from approximately 200° F. to about 450° F.) with a large increase in the volume of the gas. This high temperature, however, is of advantage in that it prevents the formation of the objectionable sulphuric acid mist which is so difficult to remove.

The formation at this stage of vapor, as distinguished from the formation of a mist, is an important consideration which will be explained in greater detail at a later part of this specification. The proportion of steam admitted may be regulated in any desired manner, and the strength of the final product varied as desired by such regulation. If the product should become too weak, then the amount of steam admitted to reaction chamber 25 is decreased, so that the concentration of the product will be increased. On the other hand, if the concentration of the product becomes too high, then obviously the amount of steam admitted should be increased. It is to be observed, however, that in any case the steam and the sulphuric anhydride are always admitted under such conditions with respect to amounts and temperatures that the resultant product is either in the form of a vapor or readily convertible into that form by the aid of supplemental heat. An electric heater of conventional type or equivalent heating device such as is indicated at 25ª, may be employed for this purpose.

When $SO_3$ and $H_2O$ are brought together in proper amounts to form directly a relatively strong acid product and at the temperatures indicated, the heat of formation of $H_2SO_4$ is sufficiently great to maintain the entire mass in the state of a vapor, but if substantial amounts of mist are formed, the product should first be converted into vapor by supplemental heat, since it is only when the product is in the form of a vapor that the condensation and collection of the sulphuric acid will proceed with that efficiency and facility which is contemplated by my invention.

In order to avoid corrosion and contamination of the sulphuric acid it is desirable to construct all of the apparatus in the C. P. sulphuric acid system which comes in contact with the sulphuric acid of a suitable resistant material such as silica or glass.

From the reaction chamber 25 or heater 25ª if one is employed the gases and the sulphuric acid vapor are conducted through a suitable condenser 27, preferably air cooled in order to avoid undesirable chilling of the vapors as hereinafter more fully explained. In this condenser the sulphuric acid vapor is condensed and then the gases and condensed acid pass into the receiver 28. The uncondensed gases pass through a supplementary condenser 29 after leaving the receiver, in which such sulphuric acid as may have escaped condensation in the similar condenser 27 will be condensed and returned to the receiver, the remaining uncondensed gas being discharged from the system through the exit 31. The condensed sulphuric acid collects in the receiver 28 and may be withdrawn as desired through outlet 32 as C. P. product acid.

The successful operation of this portion of my process may be explained as follows: When a stream of sulphuric anhydride containing gas and hydrogen oxide (water) are brought together, a dense, white fog or mist of liquid particles of sulphuric acid is generally formed which is very difficult if not impossible to condense and is quite difficult to remove by even the commonly used methods of gas "scrubbing". Various theories have been advanced to account for the formation of this mist, and various methods have been proposed for its removal (for instance, see U. S. Patent No. 866,843), and I will not attempt to discuss them here, as this objectionable formation of mist is well-recognized in the art. I have discovered that if a stream of sulphuric anhydride gas and hydrogen oxide are brought together under conditions such that the resulting gas has a temperature sufficiently high to cause substantially all of the sulphuric acid formed to exist as a gas (as noted hereinbefore) and this sulphuric acid gas is then condensed under conditions avoiding sudden cooling or chilling of the gas, condensation of gaseous sulphuric acid to liquid sulphuric acid will proceed without the formation of any substantial amount of uncondensable acid mist. This may be explained upon the theory that if the union of sulphuric anhydride and steam is allowed to take place under conditions resulting in the formation of mist, this mist cannot be condensed in a simple condensing system, but the mist is carried along through the condenser in suspension in the gas stream. On the other hand, if the union is caused to take place under sufficiently high temperature conditions to cause substantially all of the sulphuric acid formed to exist as a gas, then this gas can be condensed as a liquid film upon the cooled surface of a simple condenser, without forming appreciable quantities of mist. The condensation probably takes place similarly to the condensation of moisture from the atmosphere upon a glass of iced water. In other words sudden cooling or chilling of the entire stream of gas carrying the sulphuric acid vapor should be avoided to prevent the precipitation of the vapor in the form of mist in the gas stream, but the cooling should be so conducted as to obtain condensation of a liquid film of acid upon the surface of the condenser due to what may be termed "local cooling" of the gas adjacent the condensing surface. If mist does initially form in a gas stream, proper subsequent condensation can be obtained by first heating the gas stream until the mist is transformed into the gaseous state, and then cooling the gas stream under the condition mentioned above.

Furthermore, I have found that my process affords a simple, easily controlled, and relatively inexpensive method of producing chemically pure sulphuric acid as compared with known distillation processes, and in addition gives a product of exceptional purity. This latter property is made possible by reason of the fact that the constituents of sulphuric acid employed in my process can be produced in a state of high purity, and from the point of formation of sulphuric acid on, the process is adapted to be carried out in apparatus almost wholly unattackable by acid. Sulphuric anhydride gas, as produced by the contact process and as liberated from oleum, is quite pure, and upon the removal of any suspended impurities from the gas stream in the filter 24 is substantially chemically pure. Hydrogen oxide in the form of steam, as employed in my preferred method of operation, is likewise substantially chemically pure. The condensed product of these two substantially chemically pure agents, reacting and condensing in apparatus substantially unattacked thereby, is therefore a substantially chemically pure product.

In addition, the entire operation from the filter 24 on may be carried out in apparatus of relatively small size which may, therefore, be constructed of silica or glass without entailing excessive expense. There is thus no opportunity for contamination of the product, either in the process of formation or subsequent to formation.

The necessary high temperature conditions to cause substantially all of the sulphuric acid formed in the reaction chamber 25 to first exist as a gas, results, in the normal operation of my process, from the sensible heat in the entering gas streams, and from the heat of formation of sulphuric acid generated by the combination of the sulphuric anhydride and steam. By using a stream of gas containing about 8% sulphuric anhydride and having an initial temperature in the neighborhood of 200° F., and by reacting with this gas hydrogen oxide in the form of steam, I find that the resulting gas will, as a result of the heat of reaction, attain a temperature such that substantially all of the sulphuric acid formed will exist as a gas. In the ordinary operation of my process, steam in substantially combining proportion is introduced into a stream of sulphuric anhydride gas to give a product consisting of strong sulfuric acid, i. e., about 95% or stronger. If the amount of steam is increased in proportion to the amount of sulphuric anhydride, the temperature of the sulphuric acid gas produced will drop somewhat and thus tend to form the uncondensable mist. Or, if the hydrogen oxide is introduced in the form of a water spray, the resulting gas temperature will drop because considerable heat will be utilized in transforming a portion of this liquid water to water vapor or steam. Under these circumstances, it would become necessary to raise the temperature of the sulphuric acid gas, either by applying external heat to the reaction chamber 25, by an auxiliary electric heater 25ª or otherwise, or by increasing the initial temperature of the incoming gas streams of sulphuric anhydride gas or steam. Thus by increasing the temperature of the incoming sulphuric anhydride gas to 300 or 400° F., a higher temperature will be produced in the reaction chamber 25. Likewise by using superheated steam the temperature may be increased. In any case, it is necessary to adjust the variables under the control of the operator to produce a temperature in the gas stream subsequent to the reaction between sulphuric anhydride and hydrogen oxide, such that substantially all of the sulphuric acid formed will exist as a gas.

The temperature necessary to be attained will in general correspond to one higher than the dew point of sulphuric acid for the amount of sulphuric acid present in the gas mixture. That is, for every concentration of sulphuric acid vapor there exists a temperature below which condensation of sulphuric acid vapor to liquid sulphuric acid will commence. For the particular gas strength which I have given by way of example, i. e., an 8% sulphuric anhydride gas to which has been added steam in substantially combining proportion, the dew point or condensation temperature is slightly under 450° F. and accordingly I cause the operation to proceed at or above this temperature. If the strength of sulphuric anhydride gas, and the proportionate amount of steam added to combine therewith, is changed, the corresponding necessary temperature in the resulting gas will change. If the amount of sulphuric acid is lowered by decreasing the strength of the sulphuric anhydride gas, then a lower temperature is permissible because the gas is not as saturated with sulphuric acid vapor as when a stronger gas is employed. This is what actually takes place in the subsequent condensing system. As the amount of sulphuric acid vapor in the gas stream is gradually lessened as condensation takes place, successively lower temperatures are necessary to cause the gas stream to become saturated with vapor and then to deposit the vapor as liquid acid upon the condenser surfaces. When steam in excess of the amount required to combine with the sulphuric anhydride present is introduced into the reaction chamber, a considerable amount of the heat generated is utilized in heating the diluting water vapor and accordingly a lower temperature will result in the gas stream than if a combining proportion of steam were introduced. If this lower temperature is below that at which substantially all of the sulphuric acid formed will exist as a gas, steps must be taken to increase the temperature by any of the methods mentioned above. A simple test by means of which the operator may ascertain if proper temperatures are existing in the reaction chamber is to merely observe the exit gas from the condensing system. If proper conditions are not being maintained, a white cloud or mist will be clearly apparent in the exit gas. An additional test may be made if desired by determining the dew point of sulphuric acid vapor of the strength existing in the reaction chamber. The reaction chamber temperature should not be substantially below this dew point.

The cooling operation occurring in the condensing system must also be controlled to prevent the formation of acid mist. I have found that the sulphuric acid gas will condense readily in an open condensing system if precautions are taken to avoid sudden cooling or chilling of the gas stream at any point. This result is readily attained by employing silica or glass pipe condensers cooled by air. In the summer, when the temperature of the air is relatively high, it may become necessary to resort to water cooling, but in any case this should be regulated to prevent undue chilling of the condenser tubes at any point. The requirement that sudden cooling or chilling be avoided will necessitate that the condensing system have a certain minimum amount of condensing surface per unit of sulphuric anhydride passed through the system per minute, and this minimum amount of condensing surface may be determined in any particular instance by increasing the condensing surface until substantially no sulphuric acid escapes from the condensing system and the exit gas is substantially free of sulphuric acid mist.

I have noted the connection of my system with a contact process system of the type shown in the Merriam patent, but it should be understood that other well-known contact process systems can be used in this connection, and if the temperature of the gases containing the sulphuric anhydride in the system involved is subjected to any very considerable reduction prior to their leaving the last heat-exchanger in the converter-heat-exchanger system, the enricher line 13 may then be introduced in the contact system at some point in advance of the last heat-exchanger therein, as hereinbefore noted.

The temperature of the gases supplied to the enricher should be appreciably greater than that of the oleum introduced into said enricher. Such a temperature relation is usually the case when oleum of the ordinary percentages manufactured (20% to 40%) is being introduced directly into the enricher from the oleum absorber in the contact process system. Oleum containing such percentages (20% to 40%) of free $SO_3$ will yield enrichment of the gases used in making C. P. sulphuric acid by my process, without involving any considerable change in the temperatures of the oleum and the converter gases from the contact process system.

If a 30% oleum were being made in the absorber from a converter gas containing 6% sulphuric anhydride, the equilibrium temperature would be around 145° F. Carrying this 30% oleum to the enricher, and there contacting it with the 6% converter gas to obtain 8% gas and an approximately 15% oleum an elevation of the oleum temperature to about 198° would be necessary, this being the approximate equilibrium temperature for 8% gas and 15% oleum. This would provide an enriched gas for the C. P. sulphuric acid system at a substantially satisfactory temperature, as hereinbefore noted, and the elevation of the oleum temperature necessary is very easily obtainable by transfer of heat from the converter gases, whose entering temperature will be between 400°-600° F.

The specific conditions noted are intended to be merely illustrative, for under some conditions it would be desirable to provide a greater enrichment of the gases supplied to the C. P. $H_2SO_4$ system. By using an appreciably stronger oleum, and elevating its temperature in contact with the converter gases a considerably enriched gas will result whose temperature may be reduced, if necessary, by a suitable cooler prior to its introduction into the C. P. sulphuric acid system.

The extent of enrichment of the gases will vary with the strength of the oleum used, the associated conditions of temperature, rates of flow, etc.; in general, the stronger the oleum and the greater the temperature increase within the enricher, the greater the enrichment of the gases.

It will be apparent from the foregoing that the method I have described presents many advantages. It is particularly well adapted from a standpoint of economy and efficiency for operation in conjunction with established methods and apparatus used in the contact process, in which oleum is usually manufactured, with but very slight disturbance in the operation of the same and but slight increase in cost. I obtain an $SO_3$ enrichment of high purity, an important factor in the manufacture of C. P. sulphuric acid, for by the use of oleum under the conditions noted only substantially pure $SO_3$ is added to the gases.

The gases from the converters in most contact process systems usually contain from 5% to 8% sulphuric anhydride, and by increasing the concentration of the sulphuric anhydride, I not only obtain a greater yield of C. P. $H_2SO_4$ for a given amount of gas, but also enhance the efficiency of the process. The increase in the content of reactive constituent proportionately decreases the content of non-reactive constituents ($N_2$, etc.) which non-productively use up energy in the heating and cooling operations, etc.

I claim:

1. The method of making chemically pure sulphuric acid which comprises liberating sulphuric anhydride gas from oleum, adding said liberated gas to a sulphuric anhydride bearing gas mixture and then contacting the resulting gas mixture with steam to form sulphuric acid gas.

2. The method of making chemically pure sulphuric acid which comprises liberating sulphuric anhydride gas from oleum, contacting said gas with hydrogen oxide in proportions to form sulphuric acid, regulating the temperature of the last mentioned operation such that substantially all of the sulphuric acid formed will exist as a gas, and then condensing the gaseous sulphuric acid to produce liquid acid.

3. The method of making chemically pure sulphuric acid which comprises enriching the sulphuric anhydride component of a gas mixture containing the same by introducing into said mixture a gas composed substantially entirely of sulphuric anhydride, then contacting said gas mixture with hydrogen oxide in approximately reacting proportions to form sulphuric acid and under thermal conditions to produce said acid in a gaseous state.

4. The method of making chemically pure sulphuric acid which comprises transferring heat from hot sulphuric anhydride containing gases to oleum whereby sulphuric anhydride gas is liberated from said oleum, enriching said sulphuric anhydride containing gases with said liberated sulphuric anhydride gas, and then contacting the enriched gases with hot hydrogen oxide to form gaseous sulphuric acid.

5. The method of making chemically pure sulphuric acid which comprises passing sulphuric anhydride containing gases in contact with oleum, regulating the temperature conditions of contact to cause liberation of sulphuric anhydride gas from said oleum, thereby enriching said gases, passing the enriched gases in contact with steam to form gaseous sulphuric acid and condensing the sulphuric acid formed.

6. The method of making chemically pure sulphuric acid which comprises passing sulphuric anhydride containing gases in contact with oleum, regulating the temperature conditions of contact to cause liberation of sulphuric anhydride gas from said oleum, thereby enriching said gases, passing the enriched gases in contact with hydrogen oxide in proportions to form sulphuric acid, regulating the temperature of the last mentioned operation such that substantially all of the sulphuric acid formed will exist as a gas, and then condensing the gaseous sulphuric acid to produce liquid acid.

7. The method of making chemically pure sulphuric acid which comprises heating oleum to liberate sulphuric anhydride gas therefrom, adding said liberated gas to a sulphuric anhydride bearing gas mixture, contacting the resulting gas mixture with water vapor in proportions and under conditions suitable for the formation of gaseous sulphuric acid, and then condensing the sulphuric acid formed.

8. The method of manufacturing chemically pure sulphuric acid in conjunction with a contact process for manufacturing sulphuric acid which comprises passing a portion of the sulphuric anhydride containing gases produced in said contact process in contact with oleum, regulating the temperature conditions of contact to produce liberation of sulphuric anhydride gas from said oleum, thereby enriching said gases and weakening said oleum, contacting the enriched sulphuric anhydride containing gases with steam to form sulphuric acid, passing other portions of said sulphuric anhydride containing gases from said contact process in contact with the weakened oleum under conditions suitable for absorption by said oleum of sulphuric anhydride from said gases, and repeating the operation using at least in part the restrengthened oleum so obtained.

9. The method of manufacturing chemically pure sulphuric acid in conjunction with a contact process for manufacturing sulphuric acid which comprises passing a portion of the sulphuric anhydride containing gases produced in said contact process in contact with oleum, regulating the temperature conditions of contact to produce liberation of sulphuric anhydride gas from said oleum, thereby enriching said gases and weakening said oleum, contacting the enriched sulphuric anhydride containing gases with hydrogen oxide in proportions to form sulphuric acid, regulating the temperature of the last mentioned operation such that substantially all of the sulphuric acid formed exists as a gas, condensing the gaseous sulphuric acid to produce liquid acid, passing other portions of said sulphuric anhydride containing gases from said contact process in contact with the weakened oleum under conditions suitable for absorption by said oleum of sulphuric anhydride from said gases, and repeating the operation using at least in part the restrengthened oleum so obtained.

10. The method of increasing the sulphuric anhydride concentration of gases containing the same produced in a contact process which comprises contacting a portion of said gases with oleum, regulating the temperature conditions of contact to increase the sulphuric anhydride concentration in said gases at the expense of said oleum, conducting away the enriched gases so formed, and contacting other portions of unenriched gases from said contact process with the weakened oleum so produced under conditions suitable for absorption by said oleum of sulphuric anhydride from said gases.

11. The method of manufacturing chemically pure sulphuric acid in conjunction with a contact process system in which oleum is manufactured which comprises passing a portion of the sulphuric anhydride containing gases produced in the system in contact with a portion of the oleum concurrently produced therein under appropriate temperature conditions to increase the sulphuric anhydride concentration of said gases at the expense of said oleum, passing the enriched gases so obtained in contact with steam under conditions to form gaseous sulphuric acid, condensing the sulphuric acid formed, and contacting the weakened oleum with other portions of the gases from said contact process system under conditions suitable for increasing the sulphuric anhydride concentration of the oleum at the expense of said gases.

12. The method of manufacturing chemically pure sulphuric acid in conjunction with a contact process system in which oleum is manufactured which comprises passing a portion of the sulphuric anhydride containing gases produced in the system in contact with a portion of oleum concurrently produced therein under appropriate temperature conditions to increase the sulphuric anhydride concentration of said gases at the expense of said oleum, passing the enriched gases in contact with water vapor under conditions to form gaseous sulphuric acid, condensing the sulphuric acid formed, contacting the weakened oleum with other portions of the gases from said contact process system under conditions suitable for increasing the sulphuric anhydride concentration of said oleum at the expense of the gases, and repeating the operation using at least in part the strengthened oleum so obtained.

13. The method of manufacturing chemically pure sulphuric acid in conjunction with a contact process for manufacturing sulphuric acid which comprises passing a portion of the hot sulphuric anhydride containing gases produced in said contact process in contact with oleum, said gases being at a temperature sufficiently above that of the oleum to produce liberation of sulphuric anhydride gas from said oleum, thereby enriching said gases and weaking said oleum, contacting the enriched sulphuric anhydride containing gases with steam to form gaseous sulphuric acid, condensing the gaseous sulphuric acid to liquid acid, passing other portions of the sulphuric anhydride containing gases from said contact process in contact with the weakened oleum while maintaining a temperature conducive to absorption of sulphuric anhydride from said gases by said oleum, conducting away the weakened gases, and repeating the operation using in whole or in part the re-strengthened oleum.

In testimony whereof, I affix my signature.
WALTER S. ALLEN.